United States Patent
Kunori

(10) Patent No.: US 9,336,322 B2
(45) Date of Patent: May 10, 2016

(54) INFORMATION PROCESSING APPARATUS FOR DISPLAYING OPERATION SCREEN ON CONSOLE SECTION BASED ON CONTENTS RECEIVED FROM EXTERNAL DEVICE, METHOD OF CONTROLLING THE SAME, AND STORAGE MEDIUM

(75) Inventor: Shiro Kunori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 13/352,809

(22) Filed: Jan. 18, 2012

(65) Prior Publication Data

US 2012/0194826 A1 Aug. 2, 2012

(30) Foreign Application Priority Data

Jan. 28, 2011 (JP) .................. 2011-016005

(51) Int. Cl.
*G06K 15/02* (2006.01)
*G06F 3/12* (2006.01)
*G06F 17/30* (2006.01)

(52) U.S. Cl.
CPC ................ *G06F 17/30899* (2013.01)

(58) Field of Classification Search
CPC ..... G06F 21/10; G06F 3/1204; G06F 3/1222; G06F 3/1238
See application file for complete search history.

(56) References Cited

U.S. PATENT DOCUMENTS

| 7,126,587 | B2 | 10/2006 | Kawakami et al. | |
| 8,223,357 | B2 * | 7/2012 | Jeon et al. | 358/1.15 |
| 8,381,111 | B2 | 2/2013 | Kawana | 715/740 |
| 2007/0146160 | A1 | 6/2007 | Takeshita | |
| 2007/0210745 | A1 * | 9/2007 | Dingeldein | 320/112 |
| 2008/0150952 | A1 | 6/2008 | Koarai | |
| 2009/0290193 | A1 * | 11/2009 | Ohba et al. | 358/1.15 |

FOREIGN PATENT DOCUMENTS

| JP | 02-122957 A | 5/1990 |
| JP | 04-323721 A | 11/1992 |
| JP | 08-331293 A | 12/1996 |
| JP | 2001-052271 A | 2/2001 |
| JP | 2004-227136 A | 8/2004 |
| JP | 2005-122602 A | 5/2005 |
| JP | 2005-284379 A | 10/2005 |

(Continued)

OTHER PUBLICATIONS

Extended European Search Report issued on Aug. 10, 2012, in counterpart application No. 12152607.3.

*Primary Examiner* — Ashish K Thomas
(74) *Attorney, Agent, or Firm* — Fitzpatrick, Cella, Harper & Scinto

(57) ABSTRACT

An information processing apparatus improved in operability when a user operates forms (buttons) displayed on a web page and in display quality of the forms (buttons) displayed on the web page. An HDD stores a plurality of form images different in size. The form images are provided for displaying a button on an operation screen. A network section, a modem, or a communication section receives data including instruction information for instructing the button to be displayed and size information representing a size of an area for detecting that the button has been touched by the user. One of the form images stored in the HDD is selected based on the instruction information and the size information. A console section displays the button with the selected form image on the operation screen.

12 Claims, 10 Drawing Sheets

(56) References Cited

FOREIGN PATENT DOCUMENTS

| | | | |
|---|---|---|---|
| JP | 2007-87398 A | 4/2007 |
| JP | 2008-139981 A | 6/2008 |
| JP | 2009-33592 A | 2/2009 |
| JP | 2010-93532 A | 4/2010 |

* cited by examiner

FIG.4

| FORM NAME | SIZE | IMAGE TO BE DISPLAYED | DEFAULT |
|---|---|---|---|
| RADIO (RADIO BUTTON) | 10 | radio.png | ○ |
| RADIO (RADIO BUTTON) | 20 | radio20.png | × |
| RADIO (RADIO BUTTON) | 30 | radio30.png | × |
| RADIO (RADIO BUTTON) | 50 | radio50.png | × |
| CHECK BOX (CHECK BOX) | 10 | checkbox.png | ○ |
| CHECK BOX (CHECK BOX) | 20 | checkbox20.png | × |
| CHECK BOX (CHECK BOX) | 30 | checkbox30.png | × |
| CHECK BOX (CHECK BOX) | 50 | checkbox50.png | × |
| TEXT (TEXT AREA) | 10 | text.png | ○ |

FIG.6

```
<html>
<head>
<meta http-equiv="Content-Type" content="text/html; charset=shift_JIS">
<meta http-equiv="Content-Style-Type" content="text/css">
<title></title>
</head>
<style type="text/css">
<!--
.size_set { width:36pt; height:36pt;}
-->
</style>
<body>
<form action="">
<input type="radio" name="kouho" value="kouho1" checked class="size_set"> candidate1 <br>
<input type="radio" name="kouho" value="kouho2" class="size_set"> candidate2 <br>
<input type="radio" name="kouho" value="kouho3" class="size_set"> candidate3 <br>
</form>
</body>
</html>
```

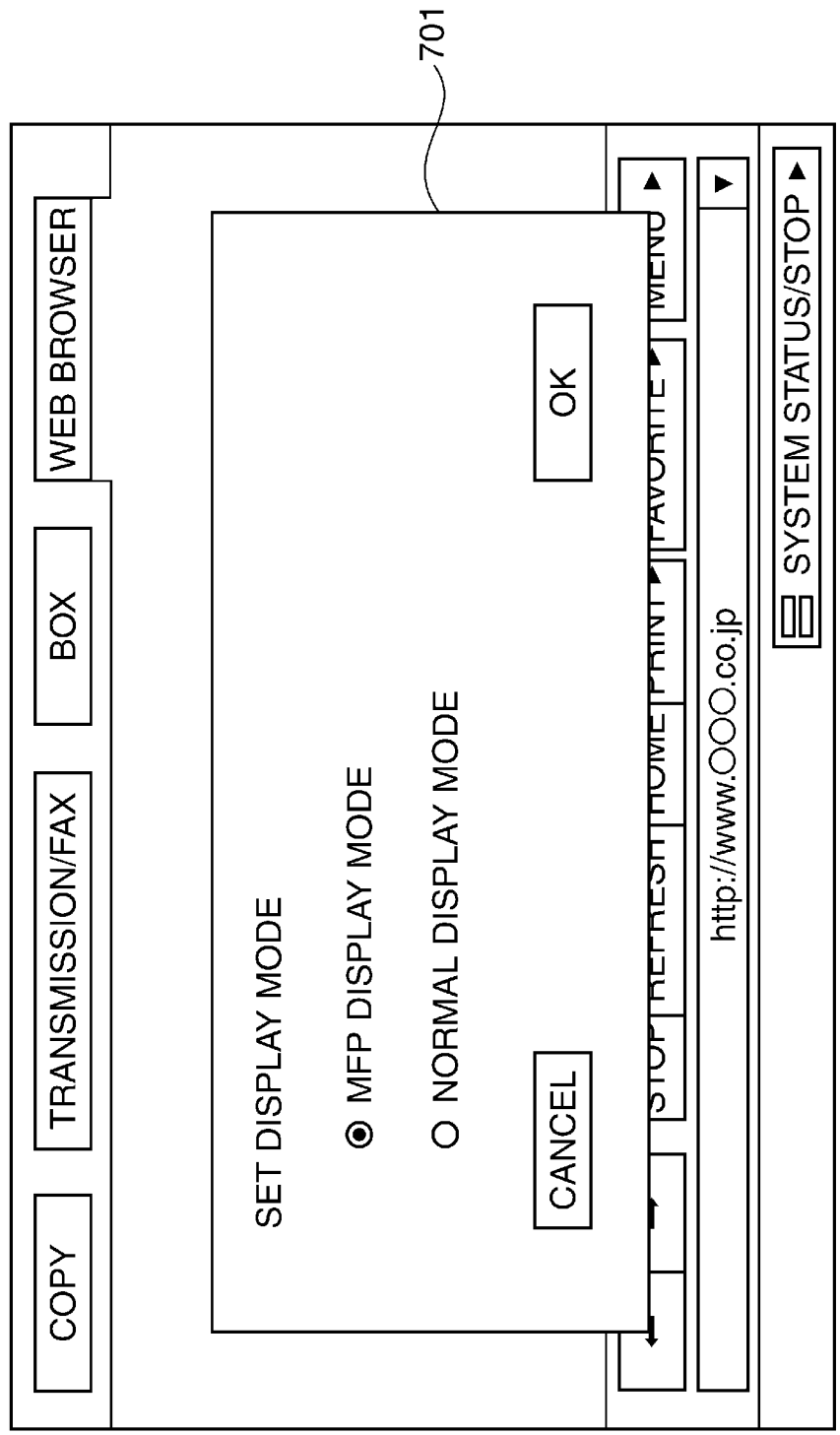

FIG.9

```
<html>
<head>
<meta http-equiv="Content-Type" content="text/html; charset=shift_JIS">
<meta http-equiv="Content-Style-Type" content="text/css">
<title></title>
</head>
<style type="text/css">
<!--
.size_set { width:36 pt; height:36 pt;}
-->
</stye>
<body>
<form action="">
<input type="radio" name="kouho" value="kouho1 " checked> candidate1 <br>
<input type="radio" name="kouho" value="kouho2 "> candidate2 <br>
<input type="radio" name="kouho" value="kouho3 " class="size_set"> candidate3 <br>
</form>
</body>
</html>
```

FIG.10A

- ◉ CANDIDATE 1
- ○ CANDIDATE 2
- ○ CANDIDATE 3

FIG.10B

- ◉ CANDIDATE 1
- ○ CANDIDATE 2
- ○ CANDIDATE 3

FIG.10C

- ▫ CANDIDATE 1
- ▫ CANDIDATE 2
- ▫ CANDIDATE 3

INFORMATION PROCESSING APPARATUS FOR DISPLAYING OPERATION SCREEN ON CONSOLE SECTION BASED ON CONTENTS RECEIVED FROM EXTERNAL DEVICE, METHOD OF CONTROLLING THE SAME, AND STORAGE MEDIUM

BACKGROUND OF THE INVENTION

1. Field of the Invention

The present invention relates to an information processing apparatus for displaying an operation screen on a console section based on contents received from an external device via a network, a method for controlling the information processing apparatus, and a storage medium storing a program for implementing the method.

2. Description of the Related Art

Conventionally, a web browser is widely known which accesses a web server, which is an example of an external device, on a network to thereby receive contents in the web server to display the contents. The web browser interprets the contents (HTML data, for example) received from the web server, thereby creating a web page. Some contents received from the web server include a command for displaying, on a web page, images of form elements (hereinafter referred to as "forms"), such as a radio button and a check box, for a user to click using a mouse or the like (see Japanese Patent Laid-Open Publication No. 2007-87398). In this case, for the images of forms (hereinafter referred to as "form images"), there are used images originally provided for the web browser. Note that each form image is stored in bitmap data format, and is uniquely determined irrespective of the settings of the font of a displayed web page, an enlargement or reduction ratio, and so forth.

Further, there has been known a technique which causes contents received from the web server to include designation of the size of forms such that form images originally provided for the web browser are displayed in the designated size. For example, in a case where the web browser receives contents shown in FIG. 9 from the web server and displays the contents, the web browser displays a web page which has form images shown in FIG. 10A arranged thereon. In the illustrated example, three radio buttons, i.e. forms of one kind, are displayed. The contents received from the web server designate a class of "size_set" for the radio button of "Candidate 3", and hence the form image of the radio button of "Candidate 3" is zoomed to a size designated by "size_set" (a width of 36 points and a height of 36 points) and is displayed.

Further, another technique is also known which displays form images according to the sizes of the form images held by the web browser, even when contents received from the web server include designation of the sizes of forms. Note that when a web page having forms arranged thereon is displayed by such a method, areas for detecting a user's click or touch with a finger on a form disposed on the displayed web page (touch detection area) is determined according to the designation of the sizes of the forms, which is included in the contents. For example, assuming that the FIG. 9 contents (HTML data) are received from the web server, when the web browser displays a web page based on the contents, form images shown in FIG. 10B are displayed on the web page. At this time, the touch detection areas of the respective forms displayed on the web page are indicated by dotted lines in FIG. 10C. Note that these dotted lines are not displayed on the web page.

There has been proposed a conventional technique in which when contents received from the web server include designation of the sizes of forms, form images held by the web browser are increased or reduced in size according to the designated sizes. In this conventional technique, however, form images become rough to degrade display quality, as shown by a radio button displayed on the left side of Candidate 3 in FIG. 10A.

Further, there has also been known a technique, in which when contents stored in the web server include designation of the sizes of forms, form images are displayed according to the sizes of the form images held by the web browser, without increasing or reducing the sizes of the form images to prevent such degradation of display quality as mentioned above. In this technique, however, as shown in FIGS. 10B and 10C, the size of the radio button appearing on the left side of Candidate 3 in FIG. 10B does not match the touch detection area (size) set on the left side of Candidate 3 in FIG. 10C. This can cause the apparatus to erroneously recognize that the radio button has been touched by the user although the user has not intended to touch the button.

SUMMARY OF THE INVENTION

The present invention provides an information processing apparatus which is improved in operability when a user operates forms (buttons) displayed on a web page, and is improved in display quality of the forms (buttons) displayed on the web page, a method of controlling the information processing apparatus, and a storage medium storing a program for implementing the method.

In a first aspect of the present invention, there is provided an information processing apparatus comprising a storage unit configured to store a plurality of form images different in size from each other, for displaying a button on an operation screen, a reception unit configured to receive data including instruction information for instructing the button to be displayed, and size information representing a size of an area for detecting a touch on the button by a user, a selection unit configured to select one of the plurality of form images stored in said storage unit based on the instruction information and the size information included in the received data, and a display unit configured to display the button with the selected form image on the operation screen.

In a second aspect of the present invention, there is provided a method of controlling an information processing apparatus including a storage unit configured to store a plurality of form images different in size from each other, for displaying a button on an operation screen, comprising receiving data including instruction information for instructing the button to be displayed, and size information representing a size of an area for detecting a touch on the button by a user, selecting one of the plurality of form images stored in the storage unit based on the instruction information and the size information included in the received data, and displaying the button with the selected form image on the operation screen.

In a third aspect of the present invention, there is provided a non-transitory computer-readable storage medium storing a computer-executable program for causing a computer to execute a method of controlling an information processing apparatus including a storage unit configured to store a plurality of form images different in size from each other, for displaying a button on an operation screen, wherein the method comprises receiving data including instruction information for instructing the button to be displayed, and size information representing a size of an area for detecting a touch on the button by a user, selecting one of the plurality of form images stored in the storage unit based on the instruction information and the size information included in the received data, and displaying the button with the selected form image on the operation screen.

According to the present invention, the operability in the case where a web page is operated on a console section is enhanced, and display quality of forms (buttons) displayed on the web page is improved.

Further features of the present invention will become apparent from the following description of exemplary embodiments with reference to the attached drawings.

BRIEF DESCRIPTION OF THE DRAWINGS

FIG. 4 is a view of a database of forms each listed with a plurality of different sizes together with images thereof.

FIG. 6 is a diagram showing contents.

FIG. 7 is a view of a display mode-setting screen.

FIG. 9 is a diagram showing contents stored in a web server of a conventional image forming apparatus.

FIGS. 10A to 10C are views of examples of displays of the contents shown in FIG. 9.

DESCRIPTION OF THE EMBODIMENTS

The present invention will now be described in detail below with reference to the accompanying drawings showing embodiments thereof. Note that in the present embodiment, a description will be given of an embodiment in which an information processing apparatus according to the present invention is applied to an image forming apparatus.

Figure 1:
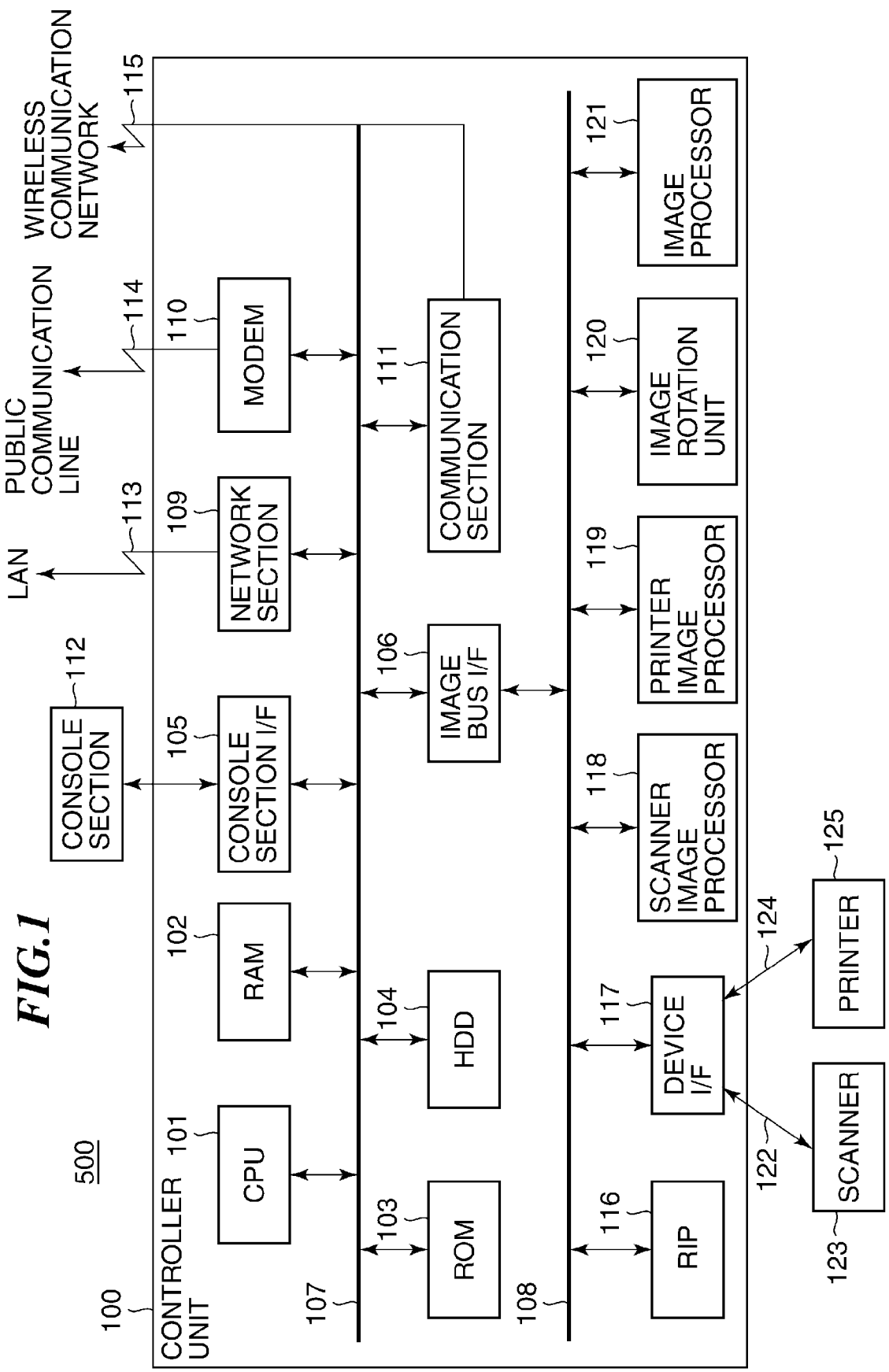
FIG. 1 is a schematic diagram of an image forming apparatus according to an embodiment of the present invention.

FIG. 1 is a schematic diagram showing the configuration of the image forming apparatus, denoted by reference numeral 500, according to the embodiment of the present invention.

In FIG. 1, the image forming apparatus 500 includes a controller unit 100, a console section 112, a scanner 123, and a printer 125.

The controller unit 100 controls a copy function using the scanner 123, a printer function for printing out data supplied from the outside via a LAN 113 using the printer 125, and input and output of image information and device information, and controls the overall operation of the apparatus. Further, the controller unit 100 also controls a communication function including a facsimile function via a public communication line 114.

The controller unit 100 has a CPU (central processing unit) 101 that executes various control programs.

The CPU 101 starts up a system by a boot program stored in a ROM (read only memory) 103, and reads control programs stored in an HDD (hard disk drive) (storage unit) 104, to execute predetermined processes using a RAM (random access memory) 102 as a work area. The HDD 104 stores the above-described various control programs and stores image data and information on all of wireless communication units (including specifications of the wireless communication units) included in a communication section 111, described hereinafter.

The RAM 102, the ROM 103, and the HDD 104 are connected to the CPU 101 via a system bus 107. Further, a console section interface (I/F) 105, a modem 110, a network section 109, and an image bus interface (I/F) 106 are connected to the CPU 101 via the system bus 107.

The console section interface 105 provides interface with the console section (user interface) (display unit) 112, and executes transfer of image data to be displayed on the console section 112 to the console section 112, transfer of a signal generated by an inputting operation via the console section 112 to the CPU 101, and like processing. The console section 112 includes a display section for displaying current settings of functions concerning image processing, information input screens for inputting configuration information on the functions, and so forth, and an input section including e.g. keys for a user to input configuration information on the functions.

The network section 109 is connected to the LAN 113, for input and output of information via the LAN 113. More specifically, the image forming apparatus 500 is configured to be capable of performing communication via a network. In a case where the web server is connected to a LAN line, it is possible to acquire contents from the web server via the LAN 113. Further, it is also possible to connect the network section 109 to the Internet e.g. via a proxy server in the LAN line to acquire contents from the web server on the Internet. The communication section 111 is connected to a wireless communication network 115. At least one of the network section 109, the modem 110, and the communication section 111 corresponds to a reception unit for receiving contents.

The modem 110 is connected to the public communication line 114, and inputs and outputs information via the public communication line 114.

The image bus interface 106 is a bus bridge that connects between the system bus 107 and an image bus 108 and converts data structure. The image bus 108 is implemented e.g. by a PCI bus that is capable of transmitting image data at a high speed or by a bus conforming to the IEEE 1394 standard. To the image bus 108 are connected a RIP (raster image processor) 116, a device interface (I/F) 117, a scanner image processor 118, a printer image processor 119, an image rotation unit 120, and an image processor 121.

The RIP 116 rasterizes a PDL code into a bitmap image.

The device interface 117 connects between the scanner 123 as an image input device and the printer 125 as an image output device, and the controller unit 100, and performs synchronous-asynchronous conversion of image data. In the present embodiment, the device interface 117 and the scanner 123 are connected to each other via a cable 122, and the device interface 117 and the printer 125 are connected to each other via a cable 124.

The scanner image processor 118 corrects, processes and edits input image data.

The printer image processor 119 performs the correction and resolution conversion of image data to be printed out by the printer 125. The image rotation unit 120 rotates image data. The image processor 121 performs JPEG compression/expansion for multivalued image data, and JBIG, MMR or MH compression/expansion for binary image data.

As described above, the CPU 101 of the controller unit 100 performs centralized control over access to and from a variety of devices connected to the system bus 107 based on control programs, and reads image information from the scanner 123 via the device interface 117. Further, the CPU 101 performs a control operation for executing predetermined processing on the read image information, and then delivering the image information to the printer 125 via the device interface 117, and like other control operations. Furthermore, the CPU 101 carries out image conversion of image data and document files acquired via the network section 109 and the modem 110, and stores the image data and the document files subjected to the image conversion in the HDD 104 or outputs the same to the printer 125.

Figure 2:
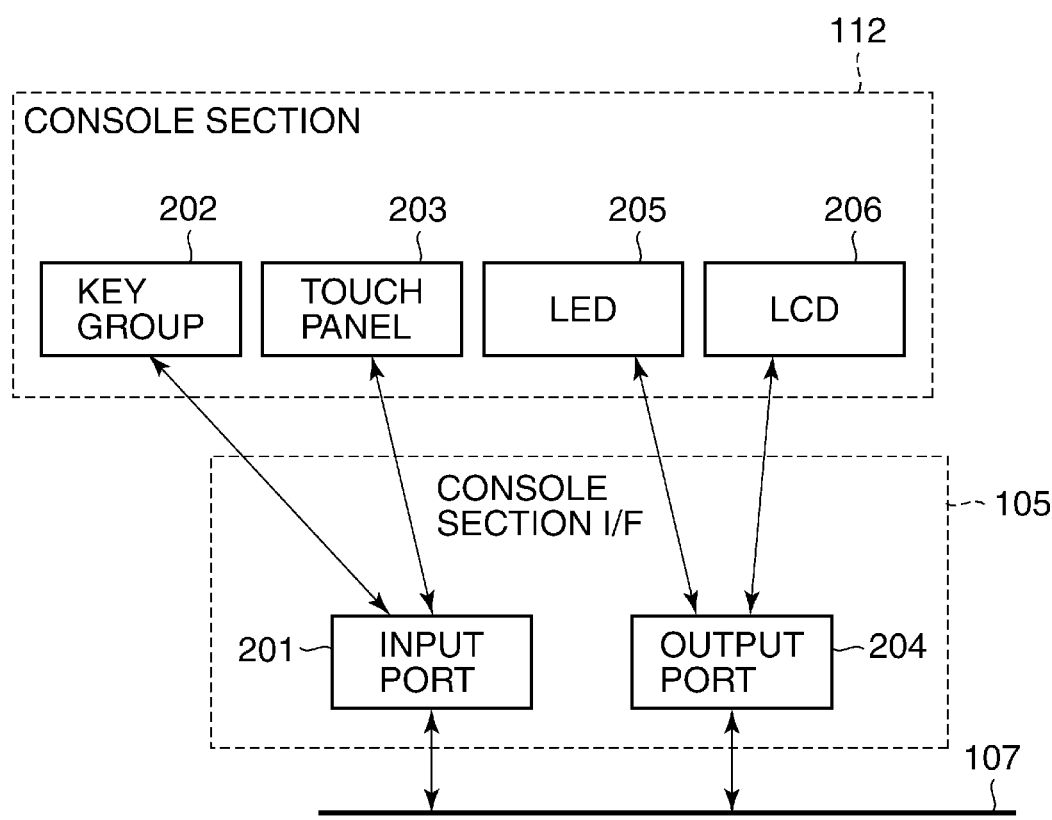
FIG. 2 is a diagram of a console section and a console section interface (I/F) appearing in FIG. 1.

FIG. 2 shows the arrangement of the console section 112 and the console section interface 105 appearing in FIG. 1.

Referring to FIG. 2, the console section 112 comprises a key group 202, a touch panel 203, an LED (light emitting diode) 205, and an LCD (liquid crystal display) 206. Further, the console section interface 105 comprises an input port 201, and an output port 204.

The touch panel 203 and the key group 202 of hard keys of the console section 112 are connected to the CPU 101 via the input port 201 of the console section interface 105. Further, position information indicative of a touched position on the touch panel 203, and key information associated with touching on a key of the key group 202 are input to the CPU 101 via the input port 201.

The LED 205 and the LCD 206 (operation screen) of the console section 112 are connected to the CPU 101 via the output port 204 of the console section interface 105, and turn-on of the LED 205 and display of the LCD 206 are controlled by the CPU 101. Normally, the touch panel 203 is a transparent sheet-like pressure sensing device, and is disposed on the LCD 206 in an overlapping manner. When the user directly touches an operation object, such as an imaginary button, displayed on the LCD 206, the touch panel 203 detects position information of the operation object.

When the touch panel 203 detects the position information, the CPU 101 detects what operation object has been designated (touched) by the user, based on the operation object currently displayed on the LCD 206 and information on position coordinates thereof. Then, the CPU 101 determines a command to be executed when the detected operation object is touched, out of commands stored in advance in the ROM 103 or the HDD 104, and executes the command. This creates screen data to be displayed on the LCD 206. The screen data is transmitted from the CPU 101 to the LCD 206 via the output port 204, whereby the display on the console section 112 can be changed. Note that such internal processing responsive to a user operation on the LCD 206 is common to all types of operation-responsive processing in the following description, and hence description thereof is omitted hereinafter. Further, it is assumed that in the following description, unless otherwise specified, executions of processing and determinations are all performed by the CPU 101, and settings, results of the executions of processing, and states of the system are all stored in the HDD 104.

Figure 3:
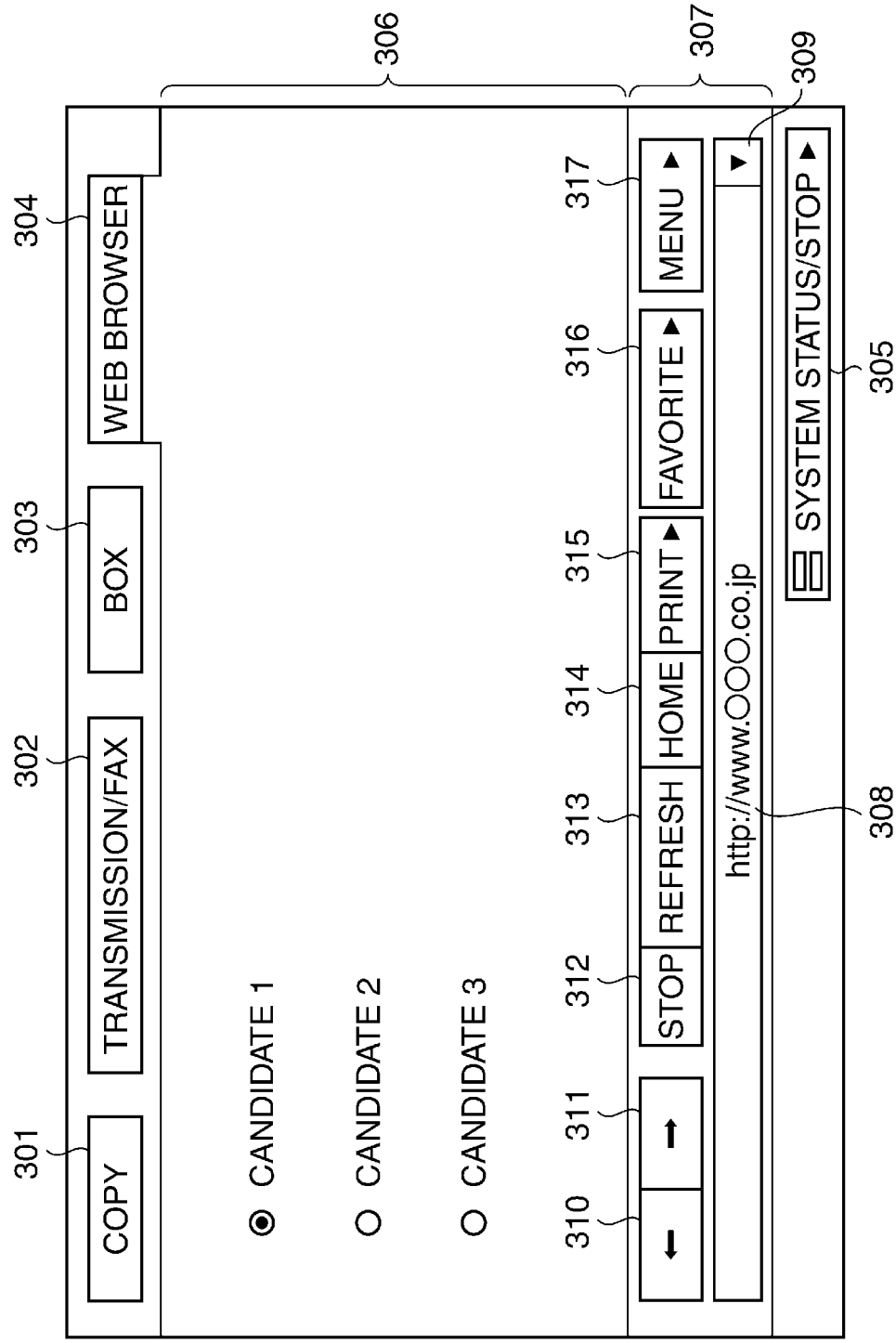
FIG. 3 is a view showing an example of a display on an LCD appearing in FIG. 2.

FIG. 3 is a view showing an example of a display on the LCD 206 of the console section 112 appearing in FIG. 2.

Referring to FIG. 3, the console section 112 displays not only buttons for configuring settings but also a button 301 for switching the display screen to a configuration screen for using the copy function. Further, the console section 112 also displays a transmission/fax button 302 for switching the display screen to a configuration screen for using a transmission/facsimile function. Further, the console section 112 also displays a box button 303 for switching the display screen to a configuration screen for using a box function (function for storing data in a box). Further, the console section 112 also displays a web browser button 304 for switching the display screen to a screen for using a web browser function. Furthermore, the console section 112 also displays a system status/stop button 305 for switching the display screen to a screen for displaying a system status of the image forming apparatus and a currently operating job. Note that FIG. 3 shows the configuration screen for using the web browser function which is displayed when the user touches the web browser button 304. Further, the buttons 301 to 305 are always displayed, and display areas 306 and 307 display different contents depending on which of the buttons 301 to 305 and a button 309 has been touched.

The display area 306 is a content display area. Contents acquired from a web server on the network are interpreted by the CPU 101, and are displayed in the display area 306 as a web page. It is assumed in the present embodiment that contents received from the web server are described using HTML (hypertext markup language). Unless otherwise specified, processing for HTML interpretation and displaying a web page based on the results of the interpretation is the same as performed by a general web browser, and hence detailed description thereof is omitted.

The display area 307 is for displaying operation items. This display area 307 displays buttons 308 to 317 indicative of items for operating the web browser.

The button 308 is a URL input and display button. This button 308 displays thereon a URL address indicative of a storage destination where contents of a web page currently displayed in the display area 306 are stored. In the illustrated example, a URL address of http://www.ooo.co.jp is displayed. Further, if the user selects the button 308, a URL designation input screen (not shown) is displayed. Now, if the user inputs a desired URL address in the URL designation input screen, it is possible to display the URL address on the button 308, and display the contents of the entered URL address, in the display area 306 as a web page.

The button 309 is a URL input history display button. When the button 309 is touched, a screen for use in designating one of URL addresses input by the user in the past is displayed on the button 308 (not shown). This makes it possible to easily instruct designation of a URL address input in the past again.

The button 310 is a back button. By touching the button 310, it is possible to go back to and display contents having been displayed in the display area 306 so far sequentially in a reverse order to a displayed order in which they were originally displayed.

The button 311 is a forward button. After going back to and display contents displayed in the past using the back button 310, by touching the button 311, it is possible to go forward to and display contents in the displayed again.

The button 312 is a stop button. By touching the button 312, it is possible to suspend reading of contents during reading of the contents from the web server.

The button 313 is a re-read button. When the button 313 is touched, the contents currently displayed in the display area 306 can be acquired from the web server again, for being displayed.

The button 314 is a home button. A predetermined single URL address is registered in advance in the HDD 104 as a home address. By touching the button 313, the contents of the home address can be displayed in the display area 306 through one-touch operation.

The button 315 is a print button. By touching the button 315, a print instruction screen for use in printing the contents currently displayed in the display area 306 is displayed.

The button 316 is a favorite button. By touching the button 316, a screen for use in selecting a URL address desired by the user from a plurality of URL addresses registered by the user in advance (not shown) is displayed. When the URL address is selected on this screen, it is possible to acquire associated contents from a web server at the URL address and display the contents in the display area 306.

The button 317 is a menu button. By touching the button 317, a screen for use in configuring various settings concerning the web browser (settings concerning e.g. display, printing, and other operations of the web browser function) is displayed.

Next, a description will be given of a process for displaying form images in the display area 306.

Each form image to be displayed in the display area 306 is designated, in contents, i.e. in the description of an HTML file, simply by a form name thereof, for example, as <input type="radio" . . . >. Therefore, when interpreting received contents, the web browser retrieves images (form images) associated with form names designated by the received contents, from the HDD 104, and displays the images in the display area 306. Although in a normal web browser, images associated with respective forms are uniquely determined, in the present embodiment, as shown in FIG. 4, referred to hereinafter, a database of forms each listed with a plurality of different sizes together with images thereof is stored in advance in the HDD 104, and optimum images to be displayed are retrieved with reference to the database.

FIG. 4 shows the database of forms each listed with a plurality of different sizes together with images thereof.

Referring to FIG. 4, an item "form name" indicates the name of a form designated in contents, and represents attributes of the form designated by "<input type=" etc. of the contents. An item "size" represents the display size of an image of the form (form image). An item "image to be displayed" indicates the file name of a form image stored in the HDD 104. An item "default" represents which of form images is to be displayed if no display size of a form is designated in received contents. If received contents do not designate the display size of a form, an image to be displayed is selected and displayed from a line indicated by a circle in an associated box of the item "default". Note that each image to be displayed which is listed on a line having a circle in the associated box of the item "default" will be hereinafter referred to as a "default image".

Each form image retrieved from the HDD 104 is displayed on the console section 112 as a portion (element) of a web page. Further, when the user selects (touches) a form image on the web page, the CPU 101 detects the coordinates of the form image touched by the user on the console section 112. Further, the CPU 101 reads and executes a program module of a process corresponding to the touched form image, from the HDD 104, based on the screen displayed on the console section 112 and the coordinates of the touched form image. Hereinafter, internal processing to be executed when a form image (accurately, an image representing a control component corresponding to a form) is touched on the console section 112 will be omitted.

Figure 5:
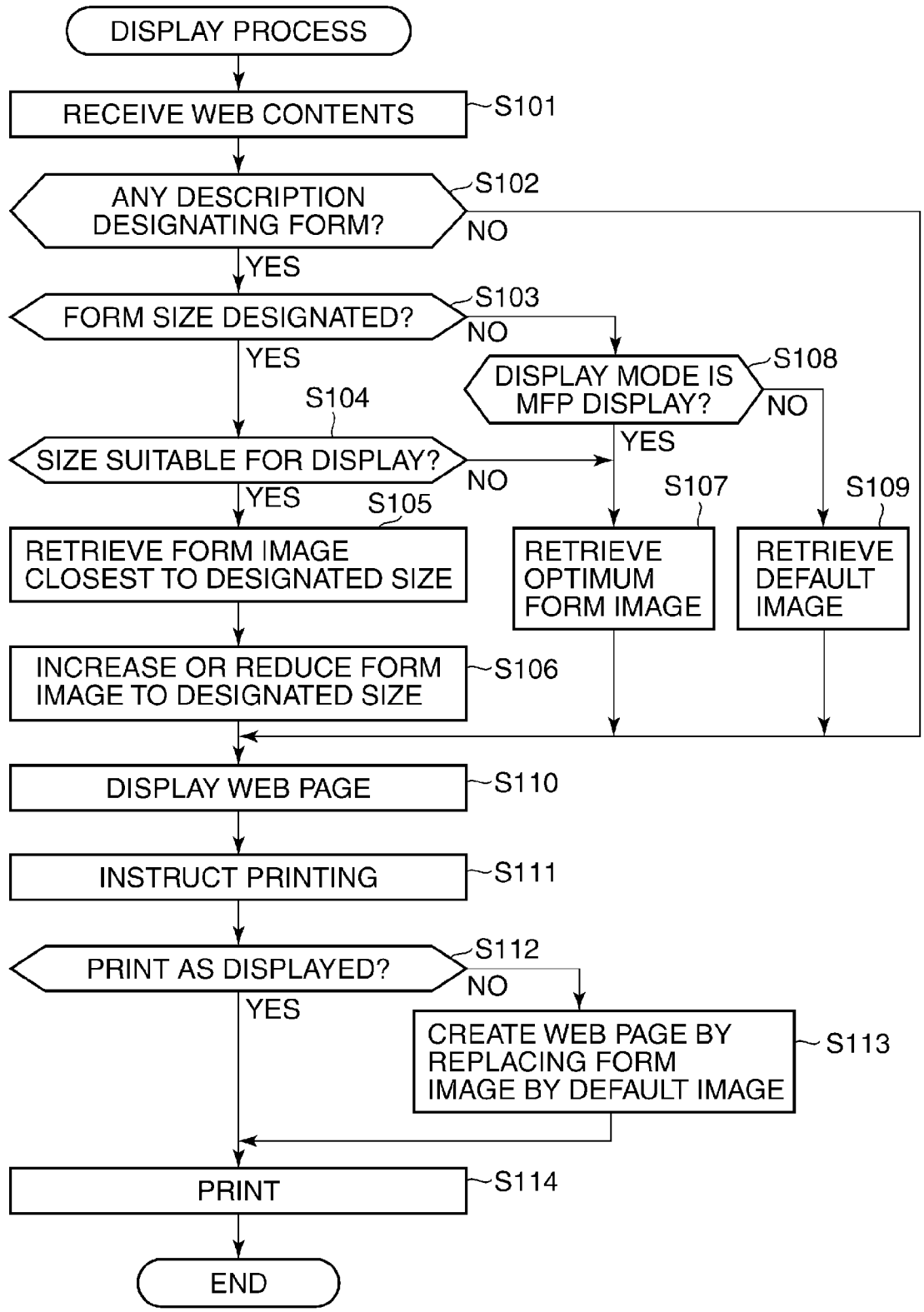
FIG. 5 is a flowchart of a display process executed by the image forming apparatus shown in FIG. 1.

FIG. 5 is a flowchart of a display process executed by the image forming apparatus 500 shown in FIG. 1.

The display process in FIG. 5 is executed by the CPU 101 of the image forming apparatus 500 shown in FIG. 1.

When the CPU 101 detects that a URL has been input by the user using the button 308, the CPU 101 acquires contents from a web server at the input URL (step S101). In the illustrated example, it is assumed that contents of http://www.ooo.co.jp are received, and the contents received at this time are shown in FIG. 6.

Then, it is determined whether or not the received contents have a description designating a form (step S102). It is assumed that in the step S102, the description of the received contents is checked from its top to determine whether or not there is a description starting with <form>. In the case of the contents shown in FIG. 6, there is a description starting with <from>, and hence it is determined that the contents have a description designating a form (include an image identifier).

If it is determined in the step S102 that the contents have no description designating a form (NO to the step S102), a web page is created, similarly to the general web browser, and the display area 306 is caused to display the web page (step S110).

If it is determined in the step S102 that the contents have a description designating a form (YES to the step S102), it is further determined whether or not the size of the form is designated (step S103). Specifically, It is determined in the step S103 whether or not the description of a <form> tag includes a description that means an attribute of width or height. In the case of the contents shown in FIG. 6, a class of "size_set" is designated by the form of a radio button (input type="radio"), and a style for this class defines attributes of width and height. Therefore, it is determined that the form size is designated (a size identifier is included).

If it is determined in the step S103 that the size of the form is not designated (NO to the step S103), the CPU 101 proceeds to a step S108, whereas if it is determined in the step S103 that the size of the form is designated (YES to the step S103), it is determined whether or not the designated form size is suitable for display on the console section 112 (step S104). Here, to designate the size of a form is that to display an associated form image in an enlarged size is designated in the contents. Further, the size suitable for display is determined in advance according to at least one of the size and the resolution of the console section 112 so as to display the form image in the display area 306, and is stored in the HDD 104. Therefore, in order to determine whether or not the designated form size is suitable for display, the CPU 101 compares the form size stored in the HDD 104 and the form size designated by the contents.

If it is determined in the step S104 that the designated form size is suitable for display (YES to the step S104), the CPU 101 retrieves a form image closest in size to the form size designated by the contents from the HDD 104 (step S105), and increases or reduces the retrieved form image to make the size thereof coincident with the form size designated by the contents (step S106). Then, the CPU 101 causes the console section 112 to display the resultant image in the display area 306 as an element of a web page (step S110), and then the CPU 101 proceeds to a step S111.

If it is determined in the step S104 that the designated form size is not suitable for display (NO to the step S104), the CPU 101 retrieves an optimum form image the size of which is not smaller than a "size suitable for display" and at the same time is closest to the "size suitable for display" from the HDD 104 (step S107). Then, the CPU 101 causes the console section 112 to display the optimum form image in the display area 306 as an element of a web page (step S110), and then proceeds to the step S111.

If it is determined in the step S103 that the size of the designated form is not designated (NO to the step S103), the CPU 101 determines a display mode of the web browser (step S108). The display mode includes two types: One is an "MFP (multifunction peripheral) display mode" for displaying a large form image on a web page assuming that the user performs operation by finger on the touch panel 203 of the console section 112, and the other is a "normal display mode" for displaying a web page according to a designation in the contents, similarly to display e.g. on a personal computer. This display mode of the web browser can be set on a screen displayed when the button 317 is touched. In the present embodiment, it is assumed that a screen 701 as shown in FIG. 7 is displayed, and the display mode is set on the screen 701. Further, it is assumed that the setting of the display mode is stored by the CPU 101 in the HDD 104, and is not changed until the user intentionally changes it.

If it is determined in the step S108 that the display mode is the MFP mode (YES to the step S108), the CPU 101 proceeds to the above-described step 107, wherein the CPU 101 causes the console section 112 to display the form image in the display area 306 as an element of a web page (step S110).

If it is determined in the step S108 that the display mode is not the MFP mode (the display mode is the normal display mode) (NO to the step S108), the CPU 101 retrieves the default image of the form (step S109), and causes the console section 112 to display the default image in the display area 306 as an element of a web page (step S110). For example, in a case where the form is a radio button, by searching for the default image of the radio button from the database appearing in FIG. 4, it is possible to retrieve an image of "radio.png".

As described above, even when the size of the designated form is not designated, by performing processing for displaying a form image having a larger size according to the display mode, it is possible to display a large-sized form image which can be easily selected by the user, thereby making it possible to improve operability.

Figure 8:
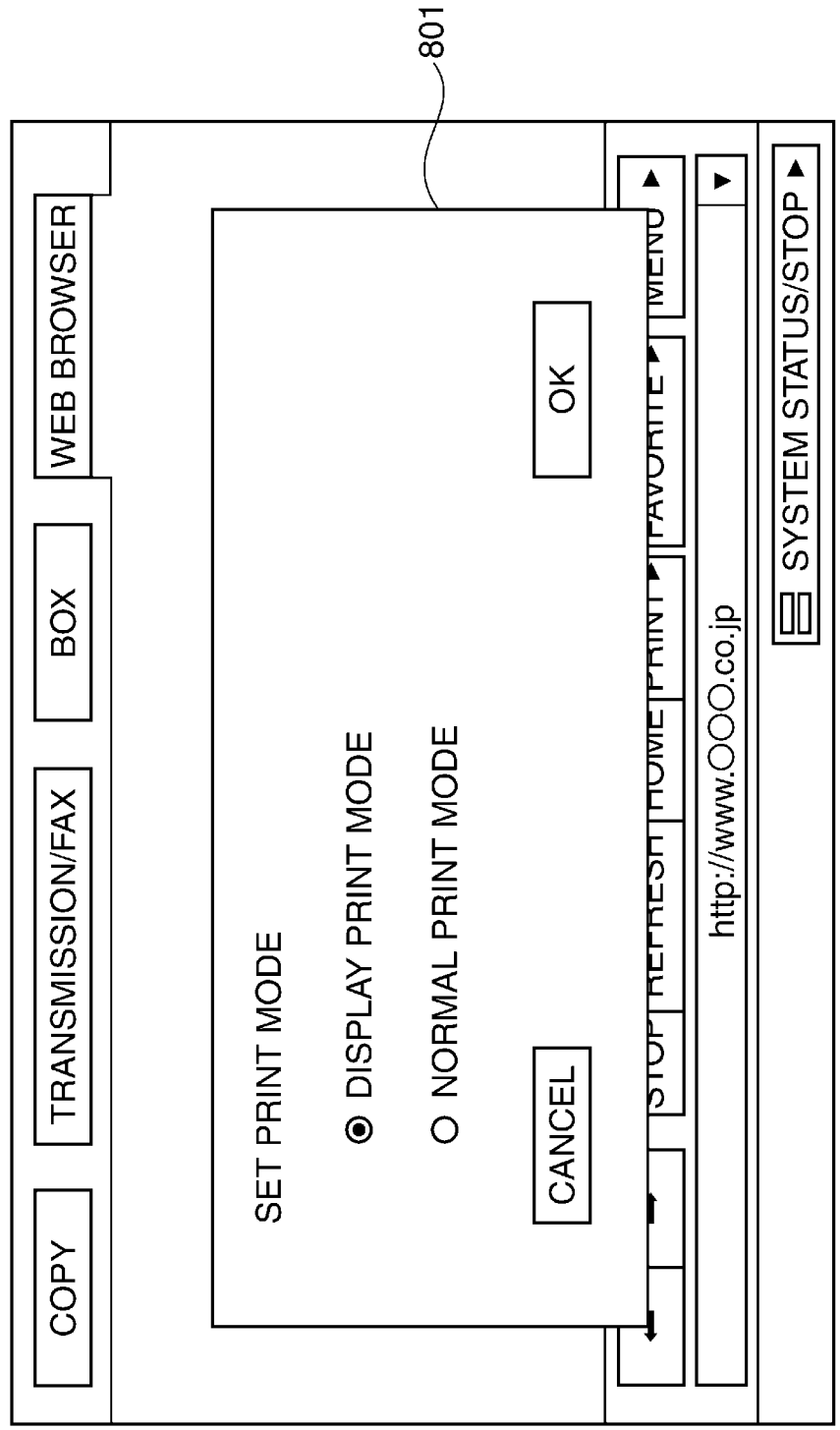
FIG. 8 is a view of a print mode-setting screen.

When the CPU 101 detects a print instruction given by user's touching on the button 315 (step S111), the CPU 101 determines whether or not a web page is to be printed as displayed, based a print mode of the web browser (step S112). This print mode includes two types: One is a "display print mode" for printing a web page as displayed in the display area 306, and the other is a "normal print mode" for printing a web page obtained by replacing all form images by default images. The print mode can be set on a screen displayed when the button 317 is touched. In the present embodiment, it is assumed that a screen 801 as shown in FIG. 8 is displayed, and the print mode is set on the screen 801. Further, it is assumed that the setting of the print mode is stored by the CPU 101 in the HDD 104, and is not changed until the user intentionally changes it.

If it is determined in the step S112 that the print mode is the display print mode, i.e. if the web page is to be printed as displayed (YES to the step S112), the web page displayed in the display area 306 is printed as it is (step S114), followed by terminating the present process.

If it is determined in the step S112 that the print mode is the normal print mode, i.e. if the web page is not printed as displayed (NO to the step S112), a web page obtained by replacing the form images by the default images of the forms (step S113), and this web page is printed by the printer 125 (step S114), followed by terminating the present process.

As described hereinabove, by performing processing, depending on the print mode, for printing default images in place of form images changed when displaying a web page, it is possible to display the web page with improved operability and maintain quality of images as viewed when the web page is printed.

According to the FIG. 5 process, when received contents include information for displaying a form, and at the same time designate a size for displaying the form (YES to the step S103), it is determined whether or not the designated size is a predetermined size for display on the console section 112 (step S104). If it is determined that the designated size is the predetermined size (NO to the step S104), an image to be displayed in place of the form image of the designated size is retrieved from the database (step S107), and the console section 112 is caused to display the retrieved image (step S110). This makes it possible to improve the quality of display of the form included in the contents.

According to the present embodiment, when received contents include information for displaying the size of a form image (YES to the step S103), the CPU 101 retrieves a form image closest in size to the designated form size, from a plurality of form images of different sizes (step S105), and increases or reduces the retrieved form image to the designated form size, to display the resultant form image (steps S106 and S110). As a consequence, it is possible to display a form image having the same size as the designated size included in the received contents. Therefore, it is possible to prevent the size of the form image displayed on an operation panel from mismatching the size of a detection area for detecting that the user has touched the form image on the operation panel, and thereby markedly enhance the operability. Further, by retrieving a form image closest in size to the designated form size, it is possible to minimize degradation of the quality of the form image, caused by enlargement or reduction of the form image, and thereby markedly improve the quality of display when the contents are displayed.

The acquisition of contents in the step S101 can be achieved not only by the button 308 but also by the button 309, the button 314 or the web browser button 304. When the web browser button 304 is touched, similarly to the case where the button 314 is touched, contents are acquired from a web server at a URL registered in advance in the HDD 104.

Next, a description will be given of an example of the determination in the step S104. For example, in a case where the contents shown in FIG. 6 are to be displayed when a form size suitable for display on the console section 112 is not smaller than 33 pt, the values of the width and the height of the radio button are both 36 pt, and hence it is determined that the designated form size is suitable for display on the console section 112. Note that instead of determining whether or not both the values of the width and the height of the radio button are suitable for display on the console section 112, it may be determined whether or not one of the values of the width and the height or the average value of the values of the width and the height is suitable for display.

Next, a description will be given of an example of a case where the console section 112 is caused to display a web page in the display area 306 in the step 110 following the step S106. Here, a case where the contents in FIG. 6 are displayed using the database in FIG. 4 will be described by way of example. First, since the width and height of form designated in the contents are both 36 pt, the CPU 101 determines that the form has a size of 36 pt. Here, the determination may be performed not by using one of the values of the width and the height by using the average value of the values of the width and the height. After that, the CPU 101 detects that the form image designated by the contents is a radio button (detects from input type="radio"). Further, the CPU 101 retrieves, with reference to the database shown in FIG. 4, "radio30.png" (size 30) as a form image closest in size to 36 pt of all the form images of the radio button. Furthermore, since the form size designated by the contents is 36 pt, the CPU 101 increases the size of "radio30.png", which is a form image of the size of 30 pt, to 1.2 times its original size, and displays the resultant form image as an element of a web page in the display area 306.

Note that a form image may be retrieved by a method of retrieving a form image which is closest in size to a form size designated in the contents and at the same time larger in size than the designated form size. This takes into account the fact that a method of reducing the size of a form image can prevent degradation of display quality in comparison with a method of increasing the size thereof. If the above-described retrieval method is employed, since the form size designated by the contents is 36 pt in the above-described example, a form image "radio50.png" (size 50), the size of which is closest to 36 pt, and at the same time is larger than 36 pt, is retrieved. Further, since the form size designated by the contents is 36 pt, the CPU 101 reduces the size of "radio50.png", which is a form image of the size of 50 pt, to 0.72 times its original size, and displays the resultant form image as an element of a web page in the display area 306. This makes it possible to further reduce the degradation of quality of display, caused by zooming.

Next, a description will be given of an example of a case where the console section 112 is caused to display a web page in the display area 306 in the step S110 after the CPU 101 proceeds through the steps S104 and S107. Here, a case will be described by way of example in which a form size suitable for displaying a form image is set to be not smaller than 40 pt and is stored in advance in the HDD 104, and the contents shown in FIG. 6 are displayed using the database shown in FIG. 4. In this case, with reference to the database in FIG. 4, the CPU 101 retrieves a form image "radio50.png" having a size of 50 pt as a form image the size of which is not smaller than 40 pt and at the same time is closest to 40 pt.

As described above, by retrieving a form image closest in size to a form size designated by contents and creating a web page including an associated element formed based on the form image, it is possible to prevent degradation of quality of the web page as viewed, in comparison with a case where the web page is always created based on the same form image. Further, by displaying a form image close in size to the form size designated by the contents, the displayed form image and a detection area where touching on the form image is to be detected coincide with each other, whereby it is possible to prevent degradation of operability.

Next, a description will be given of an example of a case where the console section 112 is caused to display a web page in the display area 306 in the step S110 after the CPU 101 proceeds through the steps S108 and S107. Here, a case will be described by way of example in which the radio button is displayed using the database in FIG. 4, when a form size suitable for displaying a form image is set to be not smaller than 33 pt and is stored in advance in the HDD 104 and contents include information for displaying the radio button. In this case, with reference to the database in FIG. 4, the CPU 101 retrieves the form image "radio50.png" having a size of 50 pt as a form image the size of which is not smaller than 33 pt and at the same time is closest to 33 pt.

Although in the above-described embodiment, in the step S104 in FIG. 5, a predetermined form size is used as a form size suitable for displaying a form image, the display process may be configured such that the user can designate the suitable form size during execution of the step S104 or at timing other than this. Further, form sizes suitable for display may be the same between forms, or the form sizes may be set to have respective different values on a form-by-form basis.

Further, although in the step S107, an optimum form image is retrieved without being selected by the user, the display process may be configured such that the user can select a form image to be displayed during execution of the step S107 or at timing other than this.

Further, although in the step S109, a default image of a form is retrieved without being selected by the user, the display process may be configured such that the user can select a form image to be displayed during execution of the step S109 or at timing other than this.

Further, although in the step S113, form images replaced in the step S105, S106 or S107 are replaced by default images of the forms, the display process may be configured such that only the form images replaced in the step S107 are replaced by the default images.

Further, although in the step S113, form images are replaced by default images without being selected by the user, the display process may be configured such that the user can select form images used for replacement during execution of the step S113 or at timing other than this.

Further, although in the steps S105, S107, and S109, form images are retrieved from the HDD 104, new form images may be generated. For example, vector data items or the like, which are used as bases for generating form images to be displayed in a web page, are stored in the HDD 104. Then, when the web page is displayed, form images associated with form sizes designated by contents or with predetermined sizes are generated using the vector data items stored in the HDD 104. This can increase a processing time period for creating the form images, but it is only required that a single vector data item is stored in the HDD 104 on a form-by-form basis, and hence it is possible to reduce the amount of data stored in the HDD 104. Further, the process for increasing or reducing the size of the form image in the step S106 becomes unnecessary.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2011-016005 filed Jan. 28, 2011, which is hereby incorporated by reference herein in its entirety.

What is claimed is:

1. An information processing apparatus comprising:
 a memory configured to store a plurality of form images different in size from each other for displaying a button on an operation screen;
 a network communication interface configured (i) to receive first data including (a) instruction information for instructing the button to be displayed and (b) size information representing a size of an area for detecting a touch by a user on the button, and (ii) to receive second data that includes the instruction information but that does not include the size information;
 a processor configured such that (i) in a case in which the first data is received from the network communication interface, the processor selects a form image from the memory that is close in size to the size represented by the size information, and increases or reduces the selected form image to make the size thereof coincide with the size represented by the size information, and (ii) in a case in which the second data is received by the network communication interface, the processor selects a default image from the form images in the memory; and a display apparatus configured to display the button with the selected form image on the operation screen, the selected form image being increased or reduced if the first data is received.

2. The information processing apparatus according to claim 1,
wherein the display apparatus displays the button with the selected form image in a specific area on the operation screen,
wherein the specific area depends on a size indicated by the size information.

3. The information processing apparatus according to claim 1, wherein the processor is further configured to execute a predetermined process associated with the form image when the form image is touched by the user on the operation screen.

4. The information processing apparatus according to claim 1, wherein the processor is further configured to zoom the form image according to the specific size indicated by the size information, and
wherein the display apparatus displays the button with the selected form image zoomed by the processor.

5. The information processing apparatus according to claim 1, wherein, if a particular form image stored in the memory has a same size as a size indicated by the size information the processor selects the particular form image.

6. The information processing apparatus according to claim 5, wherein, if a form image, having a same size as a size indicated by the size information, has not been stored in the memory, the processor selects a form image from the memory that is close in size to the size indicated by the size information.

7. The information processing apparatus according to claim 1, further comprising a printer configured to execute a print process of the button with the selected form image, wherein, when the printer prints the button displayed by the display apparatus, the processor is further configured to control the printer to print a default image in place of the selected form image.

8. A method of controlling an information processing apparatus that includes a memory configured to store a plurality of form images different in size from each other for displaying a button on an operation screen, the method comprising steps of:
receiving (i) first data including (a) instruction information for instructing the button to be displayed and (b) size information representing a size of an area for detecting a touch by a user on the button, and receiving (ii) second data that includes the instruction information but that does not include the size information;
selecting from the memory (i) a form image that is close in size to the size represented by the size information included in the received first data in a case in which the first data is received, and increasing or reducing the selected form image to make the size thereof coincide with the size represented by the size information, and (ii) a default image of the form images in a case in which the second data is received; and
displaying the button with the selected form image on the operation screen, the selected form image being increased or reduced if the first data is received.

9. A non-transitory computer-readable storage medium storing a computer-executable program that when executed causes a computer CPU to perform a control method of an information processing apparatus that includes a memory configured to store a plurality of form images different in size from each other for displaying a button on an operation screen, the control method comprising steps of:
receiving (i) first data including (a) instruction information for instructing the button to be displayed and (b) size information representing a size of an area for detecting a touch by a user on the button, and receiving (ii) second data that includes the instruction information but that does not include the size information;
selecting from the memory (i) a form image that is close in size to the size represented by the size information included in the received first data in a case in which the first data is received, and increasing or reducing the selected form image to make the size thereof coincide with the size represented by the size information, and (ii) a default image of the form images in a case in which the second data is received; and
displaying the button with the selected form image on the operation screen, the selected form image being increased or reduced if the first data is received.

10. An information processing apparatus comprising:
a memory configured to store a plurality of form images different in size from each other for displaying a button on an operation screen;
a network communication interface configured (i) to receive first data including (a) instruction information for instructing the button to be displayed and (b) size information representing a size of an area for detecting a touch by a user on the button, and (ii) to receive second data that includes the instruction information but that does not include the size information;
a processor configured such that (i) in a case in which the first data is received from the network communication interface, the processor selects one of the plurality of form images in the memory based on the size represented by the size information, and enlarges or reduces the selected form image to make the size thereof coincide with the size represented by the size information, and (ii) in a case in which the second data is received by the network communication interface, the processor selects a predetermined image from the form images in the memory; and
a display unit configured to display the button with the selected form image on the operation screen, the selected form image being enlarged or reduced if the first data is received.

11. An information processing apparatus comprising:
a memory configured to store a plurality of form images different in size from each other for displaying a button on an operation screen;
a network communication interface configured to receive data including (a) instruction information for instructing the button to be displayed and (b) size information representing a size of an area for detecting a touch by a user on the button;
a processor configured to select one of the plurality of form images in the memory based on the size represented by the size information, and enlarge or reduce the selected form image to make the size thereof coincide with the size represented by the size information; and
a display unit configured to display the button with the selected form image on the operation screen, the selected form image being enlarged or reduced.

12. An information processing apparatus comprising:
a memory configured to store a plurality of form images different in size from each other for displaying a button on an operation screen;

a network communication interface configured (i) to receive first data including (a) instruction information for instructing the button to be displayed and (b) size information representing a size of an area for detecting a touch by a user on the button, and (ii) to receive second data that includes the instruction information but that does not include the size information;

a processor configured such that (i) in a case in which the first data is received from the network communication interface, the processor selects one of the plurality of form images in the memory based on the size represented by the size information, and (ii) in a case in which the second data is received by the network communication interface, the processor selects a predetermined form image from the plurality of form images in the memory; and a display unit configured to display the button with the selected form image on the operation screen.

* * * * *